(12) United States Patent
Kim et al.

(10) Patent No.: US 11,919,446 B2
(45) Date of Patent: Mar. 5, 2024

(54) APPARATUS AND METHOD FOR GENERATING SOUND OF ELECTRIC VEHICLE

(71) Applicants: Hyundai Motor Company, Seoul (KR); Kia Corporation, Seoul (KR)

(72) Inventors: Ki Chang Kim, Gyeonggi-do (KR); Dong Chul Park, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 74 days.

(21) Appl. No.: 17/888,103

(22) Filed: Aug. 15, 2022

(65) Prior Publication Data

US 2023/0278492 A1    Sep. 7, 2023

(30) Foreign Application Priority Data

Mar. 3, 2022   (KR) .................. 10-2022-0027556

(51) Int. Cl.
*B60Q 9/00*      (2006.01)
*G10K 15/02*     (2006.01)

(52) U.S. Cl.
CPC .............. *B60Q 9/00* (2013.01); *G10K 15/02* (2013.01)

(58) Field of Classification Search
CPC .......... B60Q 9/00; B60W 50/14; B60W 9/00; B60W 5/008; B60W 2270/42; G10K 15/02
See application file for complete search history.

(56) References Cited

U.S. PATENT DOCUMENTS

| | | | |
|---|---|---|---|
| 8,620,001 B2* | 12/2013 | Peachey | G10K 15/02 381/86 |
| 9,815,404 B2* | 11/2017 | Peachey | G10K 15/02 |
| 11,302,299 B2* | 4/2022 | Loh | H04R 1/028 |
| 2012/0106748 A1* | 5/2012 | Peachey | G10K 15/04 381/61 |
| 2014/0177866 A1* | 6/2014 | Peachey | B60Q 5/00 381/86 |
| 2018/0090125 A1* | 3/2018 | Yeung | B60Q 9/00 |
| 2021/0118421 A1* | 4/2021 | Bastyr | B60Q 9/00 |
| 2021/0343268 A1* | 11/2021 | Loh | H04R 3/00 |
| 2022/0355732 A1* | 11/2022 | Kim | B60W 50/10 |
| 2022/0400336 A1* | 12/2022 | Kim | G06F 3/165 |
| 2023/0103009 A1* | 3/2023 | Jeoung | B60W 30/18127 701/79 |
| 2023/0278492 A1* | 9/2023 | Kim | H04R 3/00 340/438 |
| 2023/0317072 A1* | 10/2023 | Moon | G06F 40/35 |

FOREIGN PATENT DOCUMENTS

| | | |
|---|---|---|
| KR | 10-1744716 B1 | 6/2017 |
| KR | 10-1856935 B1 | 5/2018 |
| KR | 10-2131390 B1 | 7/2020 |
| KR | 10-2022-0150692 A | 11/2022 |

* cited by examiner

*Primary Examiner* — Hoi C Lau
(74) *Attorney, Agent, or Firm* — Fox Rothschild LLP

(57) ABSTRACT

An apparatus and a method for generating a sound of an electric vehicle are provided. The apparatus determines whether a current condition may be a regenerative braking condition, generates a regenerative braking sound based on an amount of change in motor torque in the regenerative braking condition, and outputs the generated regenerative braking sound.

10 Claims, 7 Drawing Sheets

APPARATUS AND METHOD FOR GENERATING SOUND OF ELECTRIC VEHICLE

CROSS-REFERENCE TO RELATED APPLICATION

This application claims under 35 U.S.C. § 119(a) the benefit of priority to Korean Patent Application No. 10-2022-0027556, filed in the Korean Intellectual Property Office on Mar. 3, 2022, the entire contents of which are incorporated herein by reference.

TECHNICAL FIELD

The present disclosure relates to an apparatus and a method for generating a sound of an electric vehicle.

BACKGROUND

As an electric vehicle (e.g., an electric vehicle, a hydrogen electric vehicle, or the like) drives using its electric motor, because there may be no engine sound in the electric vehicle, it may be difficult for a pedestrian to recognize an approaching electric vehicle. To address the danger from the absence of sound, a virtual engine sound system (VESS) or an acoustic vehicle alerting system (AVAS) which generates a virtual engine sound and allows a pedestrian to recognize the virtual engine sound has been developed and has been compulsorily installed in the electric vehicle.

The VESS or the AVAS implements an engine sound using an electronic sound generator (ESG). The ESG may be mounted on a cowl top panel of the vehicle to generate an additional sound (or a structure vibration sound) using body vibration when the engine sound may be generated. However, as allophone occurs in a weld part of a body cowl bracket loaded with the ESG and a cowl top cover, quality costs for structural reinforcement and vibration insulation may be excessive.

SUMMARY

The present disclosure has been made to solve the above-mentioned problems occurring in the existing technologies while advantages achieved by the existing technologies may be maintained intact.

An exemplary embodiment of the present disclosure provides an apparatus and a method for generating a sound from a vehicle by generating a virtual sound based on an amount of change in motor torque upon regenerative braking.

The technical problems to be solved by the present disclosure may not be limited to the aforementioned problems, and any other technical problems not mentioned herein will be clearly understood from the following description by those skilled in the art to which the present disclosure pertains.

According to an exemplary embodiment of the present disclosure, a method for generating a sound of an electric vehicle may include determining whether a current condition may be a regenerative braking condition, generating a regenerative braking sound based on an amount of change in motor torque in the regenerative braking condition, and outputting the regenerative braking sound.

The determining of whether the current condition may be the regenerative braking condition may include identifying whether a driver manipulates an accelerator pedal and a brake pedal and determining whether the current condition may be the regenerative braking condition, when the driver takes his or her foot off the accelerator pedal or steps on the brake pedal.

The generating of the regenerative braking condition may include analyzing the amount of change in motor torque in preparation for a deceleration and acceleration pattern.

The playing and outputting of the regenerative braking sound may include determining a time point when the regenerative braking sound may be output, based on a throttle gain.

The playing and outputting of the regenerative braking sound may include performing processing of at least one of low-pass filtering, notch filtering, peak filtering, or high-pass filtering for the regenerative braking sound.

According to another embodiment of the present disclosure, an apparatus for generating a sound of an electric vehicle may include a detection device that is configured to detect whether a driver manipulates an accelerator pedal and a brake pedal and a processing device that is configured to determine whether a current condition may be a regenerative braking condition based on whether the driver manipulates the accelerator pedal and the brake pedal, generates a regenerative braking sound based on an amount of change in motor torque in the regenerative braking condition, and plays and outputs the generated regenerative braking sound.

The processing device may be configured to determine whether the current condition may be the regenerative braking condition, when the accelerator pedal is being released or when the brake pedal is being engaged. When the accelerator pedal is being released may be when the driver takes his or her foot off the accelerator pedal and when the brake pedal is being engaged may be when the driver steps on the brake pedal. Whether an accelerator pedal and/or a brake pedal or determining whether a pedal has a foot being put onto or off of the pedal may include determining on the pedal opening amount.

The processing device may analyze the amount of change in motor torque in preparation for a deceleration and acceleration pattern.

The processing device may be configured to determine a time point when the regenerative braking sound may be output, based on a throttle gain.

The processing device may be configured to process the regenerative braking sound by applying at least one of a low-pass filter, a notch filter, a peak filter, or a high-pass filter.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
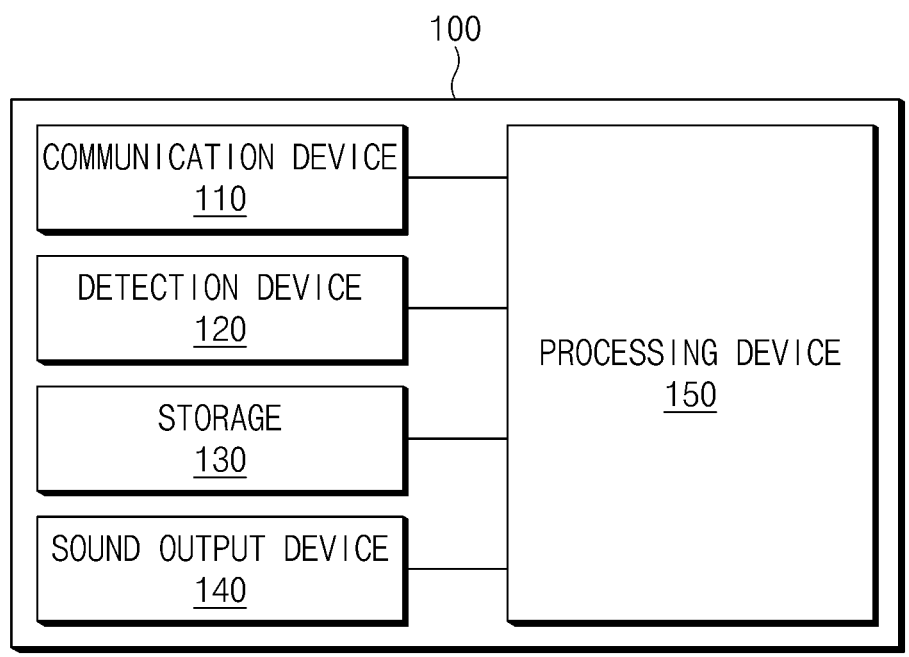
FIG. 1 is a block diagram illustrating a configuration of an apparatus for generating a sound of an electric vehicle according to embodiments of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. Fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, rom, ram, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a controller area network (can).

Unless specifically stated or obvious from context, as used herein, the term "about" is understood as within a range of normal tolerance in the art, for example within 2 standard deviations of the mean. "about" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms may be only used to distinguish one element from another element, but do not limit the corresponding elements irrespective of the order or priority of the corresponding elements. Furthermore, unless otherwise defined, all terms including technical and scientific terms used herein may be to be interpreted as may be customary in the art to which the present disclosure belongs. Such terms as those defined in a generally used dictionary may be to be interpreted as having meanings equal to the contextual meanings in the relevant field of art, and may not be to be interpreted as having ideal or excessively formal meanings unless clearly defined as having such in the present application.

FIG. 1 is a block diagram illustrating a configuration of an apparatus for generating a sound of an electric vehicle (or an electrified vehicle) according to embodiments of the present disclosure.

The electric vehicle may refer to a vehicle, such as a plug-in hybrid electric vehicle (PHEV), and/or a hybrid electric vehicle (HEY), which travels using an electric motor (or a drive motor). A sound generation apparatus 100 for generating a virtual sound may be mounted on the electric vehicle. As shown in FIG. 1, the sound generation apparatus 100 may include a communication device 110, a detection device 120, a storage 130, a sound output device 140, a processing device 150, and the like.

The communication device 110 may be configured to assist the sound generation device 100 to communicate with electronic control units (ECUs) mounted on the vehicle. The communication device 110 may include a transceiver which transmits and receives a controller area network (CAN) message using a CAN protocol. The communication device 110 may be configured to assist the sound generation apparatus 100 to communicate with an external electronic device (e.g., a terminal, a server, and the like). The communication device 110 may include a wireless communication circuit (e.g., a cellular communication circuit, a short range wireless communication circuit, and/or a global navigation satellite system (GNSS) communication circuit), a wired communication circuit (e.g., a local area network (LAN) communication circuit and/or a power line communication circuit), and/or the like.

The detection device 120 may be configured to detect vehicle information, for example, driving information, environmental information inside and outside the vehicle, and/or the like. The detection device 120 may detect vehicle information, such as a vehicle speed, a motor revolution per minute (RPM), an accelerator pedal opening amount, a brake pedal opening amount, a throttle opening amount, a vehicle interior temperature, and/or a vehicle exterior temperature, using at least one sensor and/or at least one electronic control unit (ECU), which are/is mounted on the vehicle. An accelerator position sensor (APS), a brake pedal sensor, a throttle position sensor, a global positioning system (GPS) sensor, a wheel speed sensor, a temperature sensor, a microphone, an image sensor, an advanced driver assistance system (ADAS) sensor, a 3-axis accelerometer, an inertial measurement unit (IMU), and/or the like may be used as the at least one sensor. A battery management system (BMS), a motor control unit (MCU), a vehicle control unit (VCU), and/or the like may be the at least one ECU.

The storage 130 may be configured to store a sound source such as a driving sound, a virtual sound, and/or a warning sound. The storage 130 may store an emotion recognition model, a virtual sound design algorithm, a volume setting algorithm, volume control logic, sound equalizer logic, and/or the like. The emotion recognition model may be implemented based on a sound-based emotion factor and a dynamic characteristic-based emotion factor. The virtual sound design algorithm may design a performance sound of the vehicle by adding engine sound equalizer (ESE) logic considering personalization to an existing active sound design (ASD) by means of a target profile and engine information (e.g., an RPM, a throttle, a torque, and/or the like).

The storage 130 may be a non-transitory storage medium which stores instructions executed by the processing device 150. The storage 130 may include at least one of storage media such as a random access memory (RAM), a static RAM (SRAM), a read only memory (ROM), a programmable ROM (PROM), an electrically erasable and programmable ROM (EEPROM), an erasable and programmable ROM (EPROM), a hard disk drive (HDD), a solid state disk (SSD), an embedded multimedia card (eMMC), a universal flash storage (UFS), and/or a web storage.

The sound output device 140 may be configured to output a sound source which may be previously stored or may be streamed in real time to the outside. The sound output device 140 may include an amplifier, a speaker, and/or the like. The amplifier may amplify an electrical signal of a music sound played from the sound output device 140. A plurality of speakers may be installed at different positions inside and/or outside the vehicle. The speaker may convert the electrical signal amplified by the amplifier into a sound wave.

The processing device 150 may be electrically connected with the respective components 110 to 140. The processing device 150 may include at least one of processing devices such as an application specific integrated circuit (ASIC), a digital signal processor (DSP), programmable logic devices (PLD), field programmable gate arrays (FPGAs), a central processing unit (CPU), microcontrollers, and/or microprocessors.

While the vehicle may be traveling, the processing device 150 may determine whether an accelerator pedal and a brake pedal may be operated. The processing device 150 may determine whether a driver manipulates the accelerator pedal and the brake pedal based on the accelerator pedal opening amount and the brake pedal opening amount.

When the driver manipulates the accelerator pedal, the processing device 150 may be configured to generate a virtual sound based on personalization setting information of an engine sound equalizer. The personalization setting information of the engine sound equalizer may be set by user interface (UI) manipulation of a user and may include a sound mode, volume, a tone, accelerator pedal responsiveness, and/or the like. The processing device 150 may be configured to obtain an internal input signal parameter (i.e., CAN information) and/or an external input signal parameter (e.g., GPS information) by means of the detection device 120. In other words, the processing device 150 may obtain vehicle information by means of the detection device 120. The processing device 150 may be configured to generate a virtual sound based on the obtained vehicle information. When generating the virtual sound, the processing device 150 may adjust a volume, a tone, a sound output time point, and/or the like of the virtual sound. The processing device 150 may be configured to output the generated virtual sound to the sound output device 140. The sound output device 140 may play and output the generated virtual sound under an instruction of the processing device 150.

The processing device 150 may be configured to determine whether a current condition may be a regenerative braking condition (or situation or state) based on whether the driver manipulates the accelerator pedal and the brake pedal. When the driver takes his or her foot off the accelerator pedal or steps on the brake pedal to accomplish deceleration, the processing device 150 may determine that the current condition may be the regenerative braking condition. The processing device 150 may determine whether the current condition is the regenerative braking condition based on when the accelerator pedal is being released or when the brake pedal is being engaged.

The processing device 150 may be configured to identify an amount of change in motor torque in preparation for a deceleration and acceleration pattern in the regenerative braking condition. The processing device 150 may identify the amount of change in motor torque by means of a motor control unit (MCU). The processing device 150 may be configured to generate a regenerative braking sound based on the amount of change in motor torque. The regenerative braking sound may be an emotional sound (or a virtual sound) for preventing a sense of difference of the sound in the regenerative braking condition. A drive motor (not shown) of the vehicle may be used as a generator in the regenerative braking condition and may generate a back electromotive force to charge a battery (not shown). In other words, the drive motor may convert (or recover) kinetic energy into electrical energy and may store the electrical energy in the battery.

The processing device 150 may be configured to output the regenerative braking sound through the sound output device 140. The processing device 150 may determine a time point where the regenerative braking sound may be output based on a throttle gain. The processing device 150 may perform processing of the regenerative braking sound by applying at least one of a low-pass filter, a notch filter, a peak filter, or a high-pass filter.

The processing device 150 may be configured to perform processing such as pitch control, gain control, accelerator position sensor (APS) control, frequency filtering, Shepard layer control, volume adjustment, and/or the like for the virtual sound. The pitch control may be a function of adjusting pitch of the vehicle sound, which may be a first step for volume guide. The pitch control may be a function of assisting in facilitating a vehicle virtual sound design in a virtual environment by means of tuning of a pitch rate and a grain level according to an RPM. The gain control may be a function of changing a tone and adjusting resistance, which may be a second step for psychoacoustics-based auditory evaluation. The APS control may be a function of adjusting an accelerator pedal opening amount, which may be a third step for a sound design with regard to a constant speed or acceleration driving condition of the actual vehicle. The frequency filtering may adjust a playback frequency band of the sound. The Shepard layer control may be a function of generating a second sound source and incidentally adjusting an adjustment region of the sound source, which may store and correct a sound source by means of waveform audio format (WAV) settings.

According to an exemplary embodiment, before constructing an algorithm for designing a virtual sound (i.e., a regenerative braking sound) (i.e., a sound design algorithm) for preventing a sense of difference of the sound in the regenerative braking condition, the prevention of a sense of difference of regenerative braking may be preceded by means of the robust design of a chassis transmission system structure. Thus, an allophone robust design guide for the robust design of the chassis transmission system structure may be proposed. To propose the allophone robust design guide, the following procedure may be performed. First of all, to improve ride quality and analyze an abnormal noise phenomenon upon front suspension steering, a mechanism of transmitting a chassis transmission system load may be analyzed when the steering wheel may be steered. A guide for reducing allophone due to tie rod and knuckle interference may be provided by reducing subframe and gearbox vibration. Next, an allophone sensitivity phenomenon may be analyzed upon front suspension steering. To analyze the allophone sensitivity phenomenon, it may be possible to identify whether a rattle, which may be contact allophone in the normal direction, and a squeak, which may be contact allophone in the front end direction, occur in the knuckle and bearing matching part and the bolt mounting part through tie rod steering force excitation by means of an allophone probabilistic analysis methodology. Finally, the allophone robust design guide may be provided based on the result of analyzing the allophone sensitivity phenomenon. The allophone robust design guide may include proposal of knuckle bore numerical values (e.g. an increase in knuckle bore), proposal of face step difference numerical values (e.g., bearing step difference processing), proposal of minimum and maximum bolt clamping force numerical values (e.g., an increase in bolt torque), proposal of front and rear/up and down distance between the tie rod and the bearing center (e.g., the smaller the length in the front and rear/up and down direction, the better the allophone), proposal of surface roughness of the knuckle and bearing matching surface (e.g., the larger the roughness, the better the allophone, the smaller the front end contact force), or the like.

Figure 2:
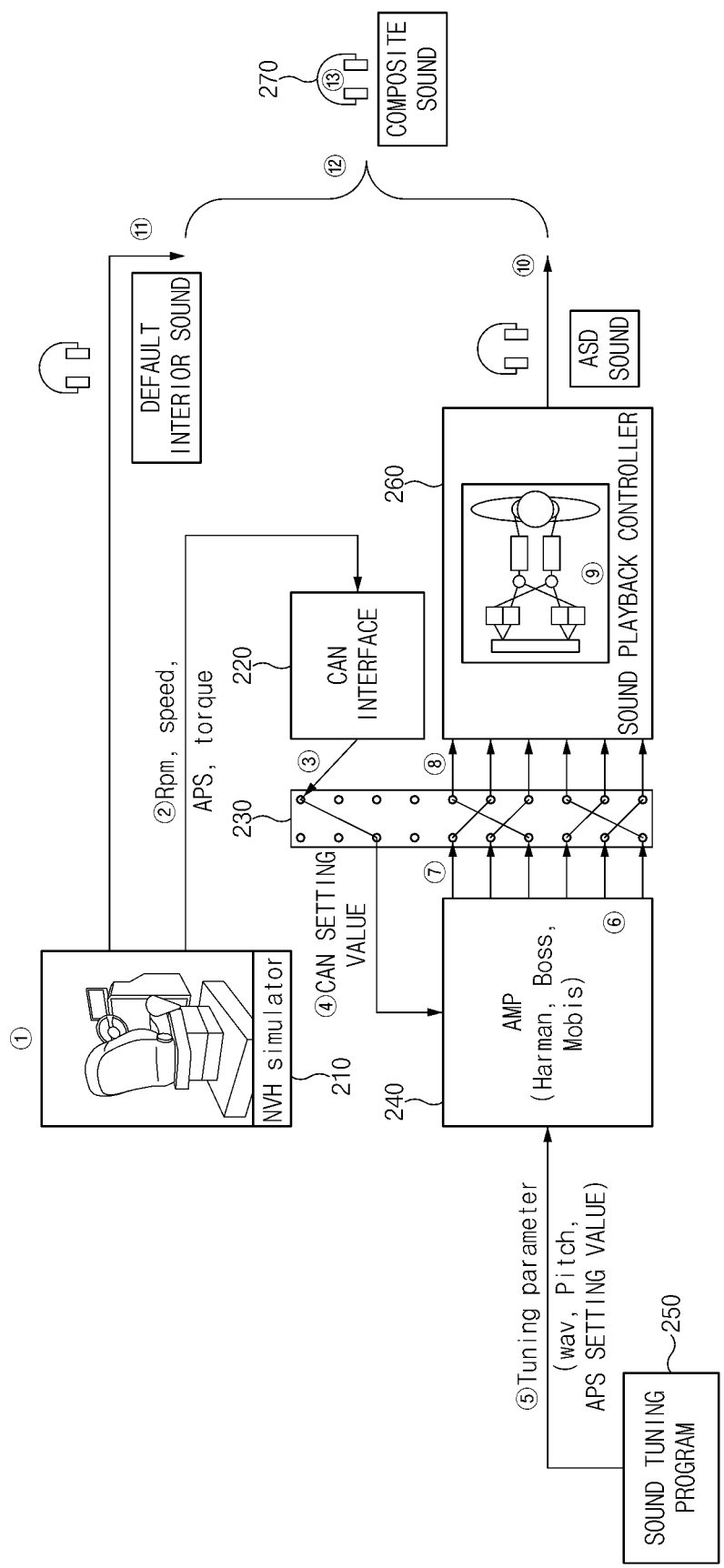
FIG. 2 is a drawing illustrating a process of tuning a virtual sound in a tuning simulator according to embodiments of the present disclosure.

FIG. 2 is a drawing illustrating a process of tuning a virtual sound in a tuning simulator according to embodiments of the present disclosure.

Referring to FIG. 2, when an accelerator pedal may be manipulated, a noise, vibration, harshness (NVH) simulator 210 may be configured to detect an amount of accelerator pedal pressure (①) The NVH simulator 210 may calculate a parameter according to the amount of accelerator pedal pressure (or a parameter calculated in a simulator model) and may deliver the calculated parameter to a CAN interface 220 (②). The parameter may be information necessary for sound tuning, which may include an RPM, a speed, an accelerator pedal opening amount (or an accelerator pedal sensor (APS) value), a torque, and/or the like.

The CAN interface 220 may be configured to deliver the CAN signal including the parameter calculated by the NVH simulator 210 to a connection terminal 230 (③). The connection terminal 230 may be configured to deliver the CAN signal to an AMP 240 (④). The AMP 240 may be configured to receive a tuning parameter of a sound tuning program 250 (⑤).

The AMP 240 may be configured to calculate an output signal according to the turning parameter and the CAN signal (⑥). The AMP 240 may be configured to deliver the calculated output signal to the connection terminal 230 (⑦). The connection terminal 230 may be configured to deliver the output signal to a sound playback controller 260 (⑧).

The sound playback controller 260 may be configured to convert six or seven output signals input from the connection terminal 230 into a stereo sound (⑨). The sound playback controller 260 may be configured to output the converted stereo sound (i.e., an ASD sound) (⑩). The sound playback controller 260 may be configured to output the ASD sound using a cavity model based on a binaural vehicle impulse response (BVIR) measurement value. BVIR refers to sound field characteristic information from a sound source in an actual vehicle to positions of the ears of a person.

The NVH simulator 210 may be configured to output a sound (or a default interior sound) recorded in the actual vehicle (⑪). The NVH simulator 210 may be configured to output the default interior sound using the CAN signal measured in the actual vehicle and a vehicle model (or a simulator model) made based on the interior sound.

A headset 270 may synchronize and synthesize the sound output from the NVH simulator 210, that is, the default sound with the stereo sound output from the sound playback controller 260, that is, the ASD sound in real time (⑫). The headset 270 may output the synthesized stereo sound (or a composite sound) (⑬).

Figure 3:
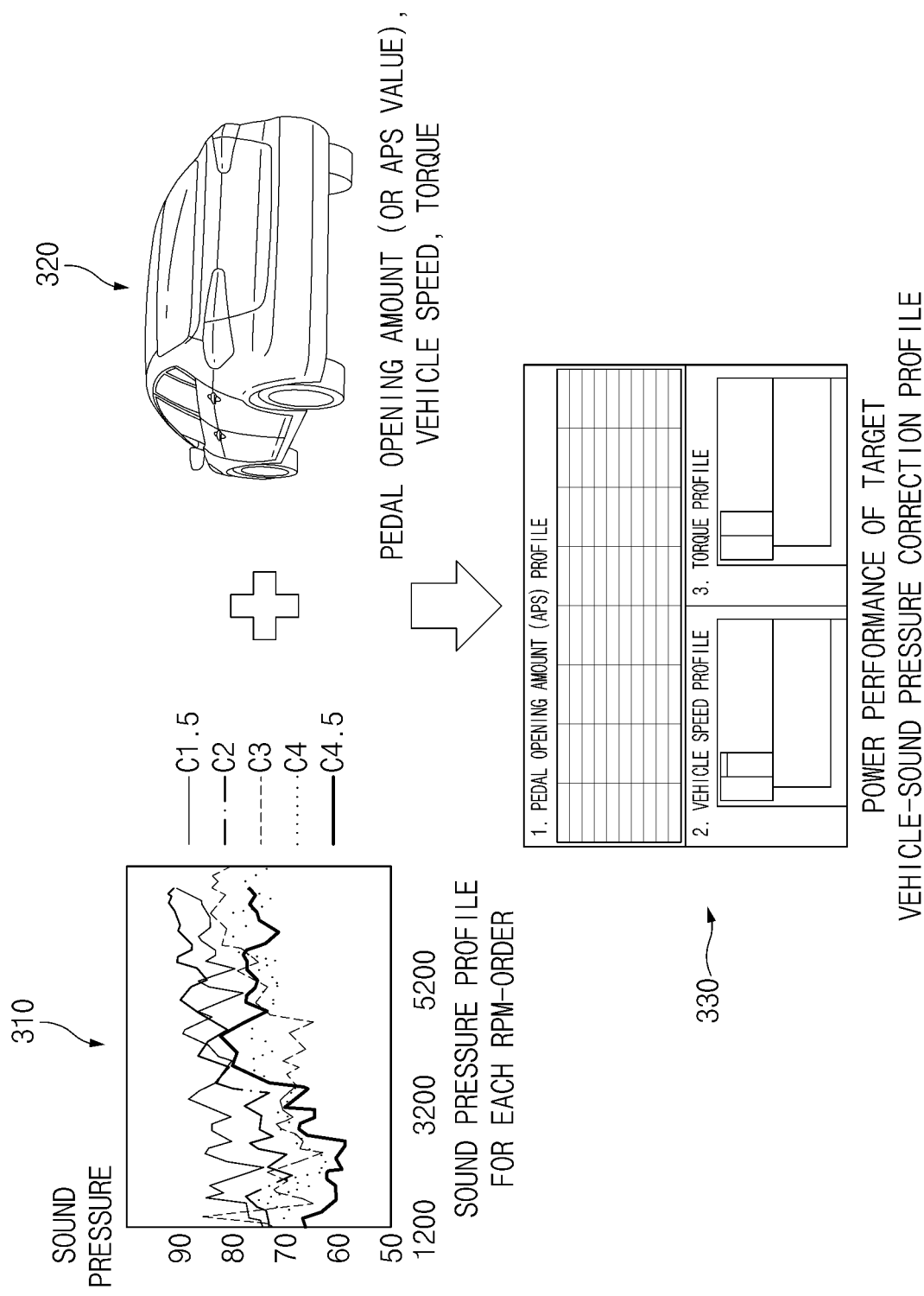
FIG. 3 is a drawing illustrating a process of implementing an active sound design (ASD) of a target engine sound according to embodiments of the present disclosure.

FIG. 3 is a drawing illustrating a process of implementing an active sound design (ASD) of a target engine sound according to embodiments of the present disclosure.

Referring to FIG. 3, an NVH simulator 210 of FIG. 2 may be configured to analyze a sound pressure profile 310 for each engine RPM-order and information 320 necessary for sound tuning to generate a sound pressure correction profile 330 according power performance of a target vehicle. The information 320 necessary for sound tuning may include an accelerator pedal opening amount (or an APS value), a vehicle speed, a motor torque, and/or the like. The sound pressure correction profile 330 may be used to implement a target engine sound.

Figure 4:
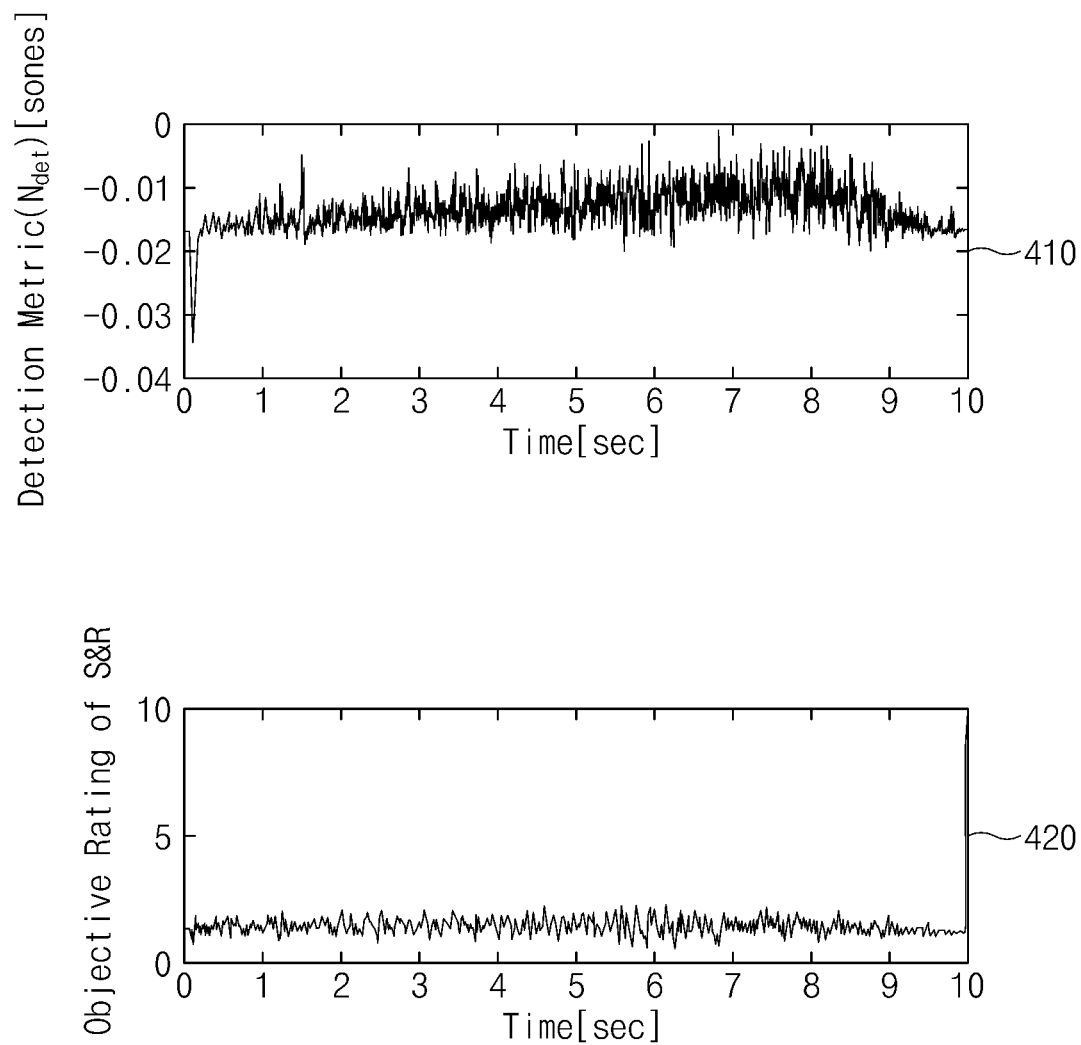
FIG. 4 is a drawing illustrating a technology of determining a sense of difference based on psychoacoustics according to embodiments of the present disclosure.

FIG. 4 is a drawing illustrating a technology of determining a sense of difference of sound based on psychoacoustics according to embodiments of the present disclosure.

The technology of determining the sense of difference of sound based on the psychoacoustics may determine the sense of difference of sound by analyzing a sound source, which may determine whether the sense of difference of sound occurs by means of a quantitative determination index (e.g., a detection metric) 410 and/or an emotional determination index (e.g., an objective rating) 420 for the sound source, as shown in FIG. 4. At this time, when the quantitative determination index may be greater than 0.2, it may be determined as being depressed. When the quantitative determination index may be greater than 0 and may be less than or equal to 0.2, it may be determined as instability. When the quantitative determination index may be less than or equal to 0, it may be interpreted as being pleasant. As the emotional determination index may be high in number, it may be interpreted that it may be indicated as being depressed. As the emotional determination index may be low in number, it may be interpreted that it may be indicated as being pleasant. Thus, a criterion of determining a sense of difference of sound may be set using at least one of the quantitative determination index or the emotional determination index. For example, when the quantitative determination index of 0.2 may be set to the criterion of determining the sense of difference of sound, it may be determined that the sense of difference of sound occurs when the quantitative determination index for a sound generated in the vehicle may be greater than 0.2 and it may be determined that the sense of difference of sound does not occur when the quantitative determination index for the sound generated in the vehicle may be less than or equal to 0.2.

Figure 5A:
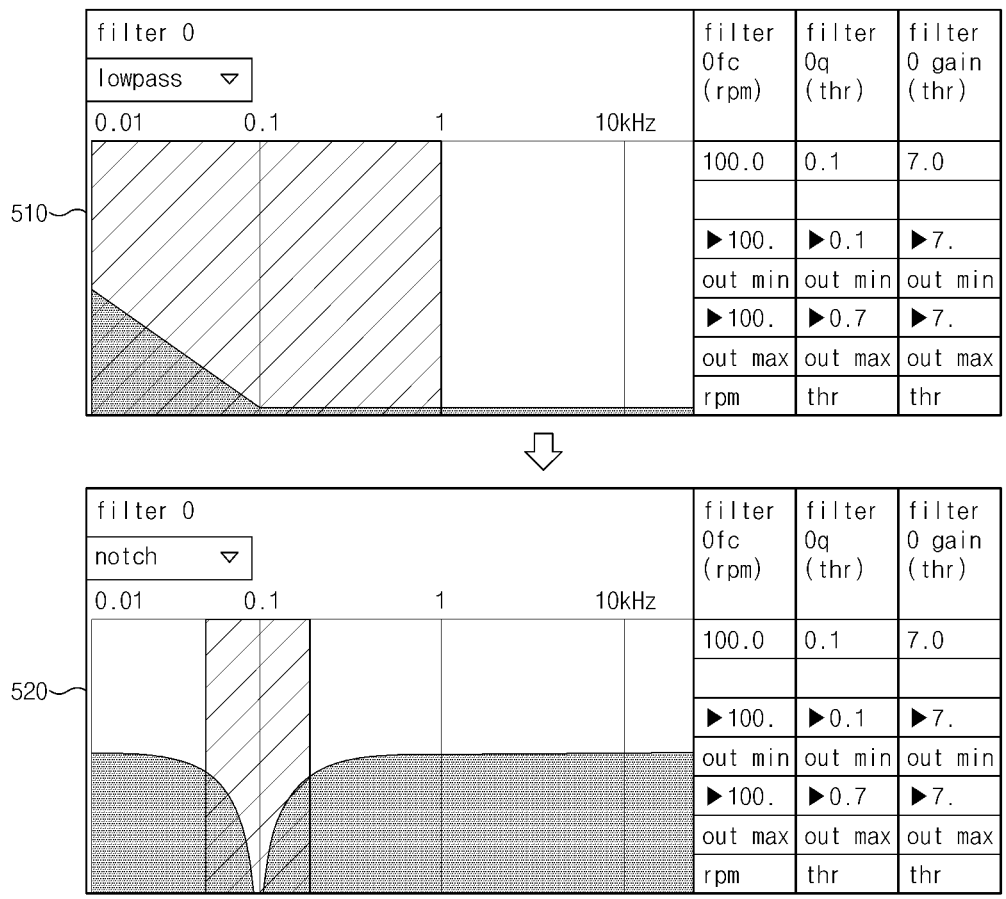
FIGS. 5A-5B are drawings illustrating examples of applying filtering techniques according to embodiments of the present disclosure.
Figure 5B:
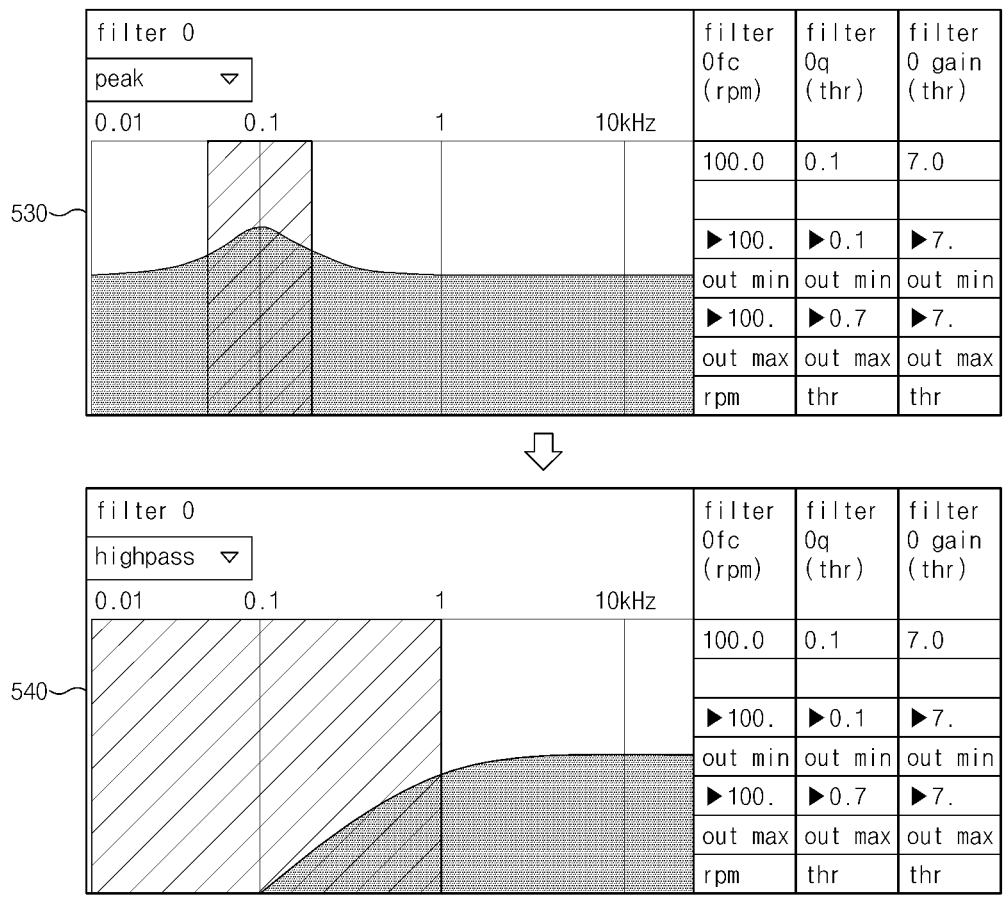

FIGS. 5A-5B are drawings illustrating examples of applying filtering techniques according to embodiments of the present disclosure.

A processing device 150 of FIG. 1 may be configured to output a regenerative braking sound through a sound output device 140 of FIG. 1. At this time, the processing device 150 may perform low-pass filtering 510 of the regenerative braking sound in a regenerative braking sound playback start interval. The processing device 150 may perform notch filtering 520 and peak filtering 530 in a regenerative braking sound playback middle interval. The processing device 150 may perform high-pass filtering 540 in a regenerative braking sound playback end interval.

Figure 6:
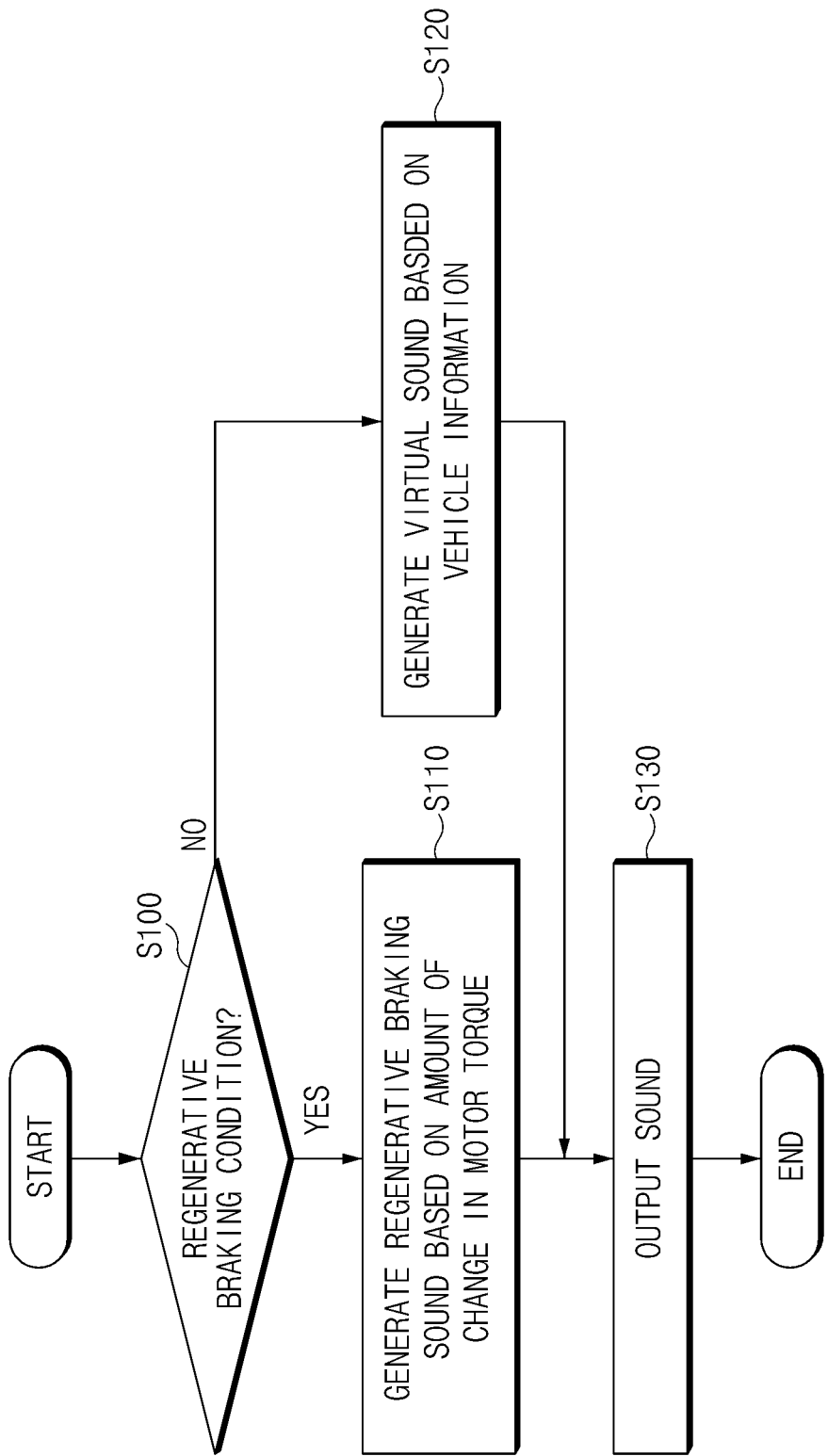
FIG. 6 is a flowchart illustrating a method for generating a sound of an electric vehicle according to embodiments of the present disclosure.

FIG. 6 is a flowchart illustrating a method for generating a sound of an electric vehicle according to embodiments of the present disclosure.

In S100, a processing device 150 of FIG. 1 may determine whether a current condition is a regenerative braking condition. The processing device 150 may determine whether the current condition is the regenerative braking condition based on whether a driver manipulates an accelerator pedal and a brake pedal. For example, when the driver takes his or her foot off the accelerator pedal or steps on the brake pedal, the processing device 150 may determine that a current situation is a regenerative braking situation. In other words, the processing device 150 may recognize a deceleration or braking situation as the regenerative braking condition. The processing device 150 may determine whether the current condition is the regenerative braking condition based on when the accelerator pedal is being released or when the brake pedal is being engaged.

In S110, the processing device 150 may generate a regenerative braking sound based on an amount of change in motor torque in the regenerative braking condition. The processing device 150 may generate (or design) a regenerative braking sound using a sound design algorithm. The processing device 150 may analyze the amount of change in motor torque in preparation for an acceleration and deceleration pattern and may adjust the regenerative braking sound based on the analyzed result. In the regenerative braking condition, a drive motor may recover kinetic energy as electrical energy and may store the electrical energy in a battery.

When the current condition is not the regenerative braking condition in S100, in S120, the processing device 150 may generate a virtual sound based on vehicle information. The processing device 150 may generate a virtual sound based on a vehicle interior temperature, a vehicle exterior temperature, a vehicle speed, an accelerator pedal opening amount, a throttle opening amount, and/or the like.

In S130, the processing device 150 may output the generated regenerative braking sound or the generated virtual sound. The processing device 150 may output the sound through a sound output device 140 of FIG. 1. The sound output device 140 may output the sound. The processing device 150 may determine a time point where the regenerative braking sound is output based on a throttle gain. When a current time point arrives at the determined output time point, the processing device 150 may generate and output the regenerative braking sound. Furthermore, when outputting the regenerative braking sound, the processing device 150 may perform processing of at least one of low-pass filtering, notch filtering, peak filtering, or high-pass filtering for the regenerative braking sound.

Embodiments of the present disclosure may generate a virtual sound based on the amount of change in motor torque upon regenerative braking, thus preventing a sense of difference between the brake pedal opening amount and the sound in a regenerative braking situation.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A method for generating a sound of an electric vehicle, the method comprising:
   determining, by a processing device, whether a current condition is a regenerative braking condition;
   generating, by the processing device, a regenerative braking sound based on an amount of change in motor torque in the regenerative braking condition; and
   outputting, by the processing device, the regenerative braking sound.

2. The method of claim 1, wherein the determining of whether the current condition is the regenerative braking condition includes:
   identifying, by the processing device, whether a an accelerator pedal and a brake pedal are being manipulated; and
   determining, by the processing device, whether the current condition is the regenerative braking condition when the accelerator pedal is being released or when the brake pedal is being engaged.

3. The method of claim 1, wherein the generating of the regenerative braking condition includes:
   analyzing, by the processing device, the amount of change in motor torque in preparation for a deceleration or acceleration pattern.

4. The method of claim 1, wherein the outputting of the regenerative braking sound includes:
   determining, by the processing device, a time point when the regenerative braking sound is output, based on a throttle gain.

5. The method of claim 1, wherein the outputting of the regenerative braking sound includes:
   performing, by the processing device, processing of at least one of low-pass filtering, notch filtering, peak filtering, or high-pass filtering for the regenerative braking sound.

6. An apparatus for generating a sound of an electric vehicle, the apparatus comprising:

a detection device configured to detect whether a an accelerator pedal and a brake pedal are being manipulated; and a processing device configured to:

determine whether a current condition is a regenerative braking condition based on whether the accelerator pedal and the brake pedal are being manipulated, generate a regenerative braking sound based on an amount of change in motor torque in the regenerative braking condition, and output the generated regenerative braking sound.

7. The apparatus of claim 6, wherein the processing device is configured to determine the current condition is the regenerative braking condition when the accelerator pedal is being released or when the brake pedal is being engaged.

8. The apparatus of claim 6, wherein the processing device is configured to analyze the amount of change in motor torque in preparation for a deceleration or acceleration pattern.

9. The apparatus of claim 6, wherein the processing device is configured to determine a time point when the regenerative braking sound is output based on a throttle gain.

10. The apparatus of claim 6, wherein the processing device is configured to process the regenerative braking sound by applying at least one of a low-pass filter, a notch filter, a peak filter, or a high-pass filter.

* * * * *